Patented Mar. 23, 1926.

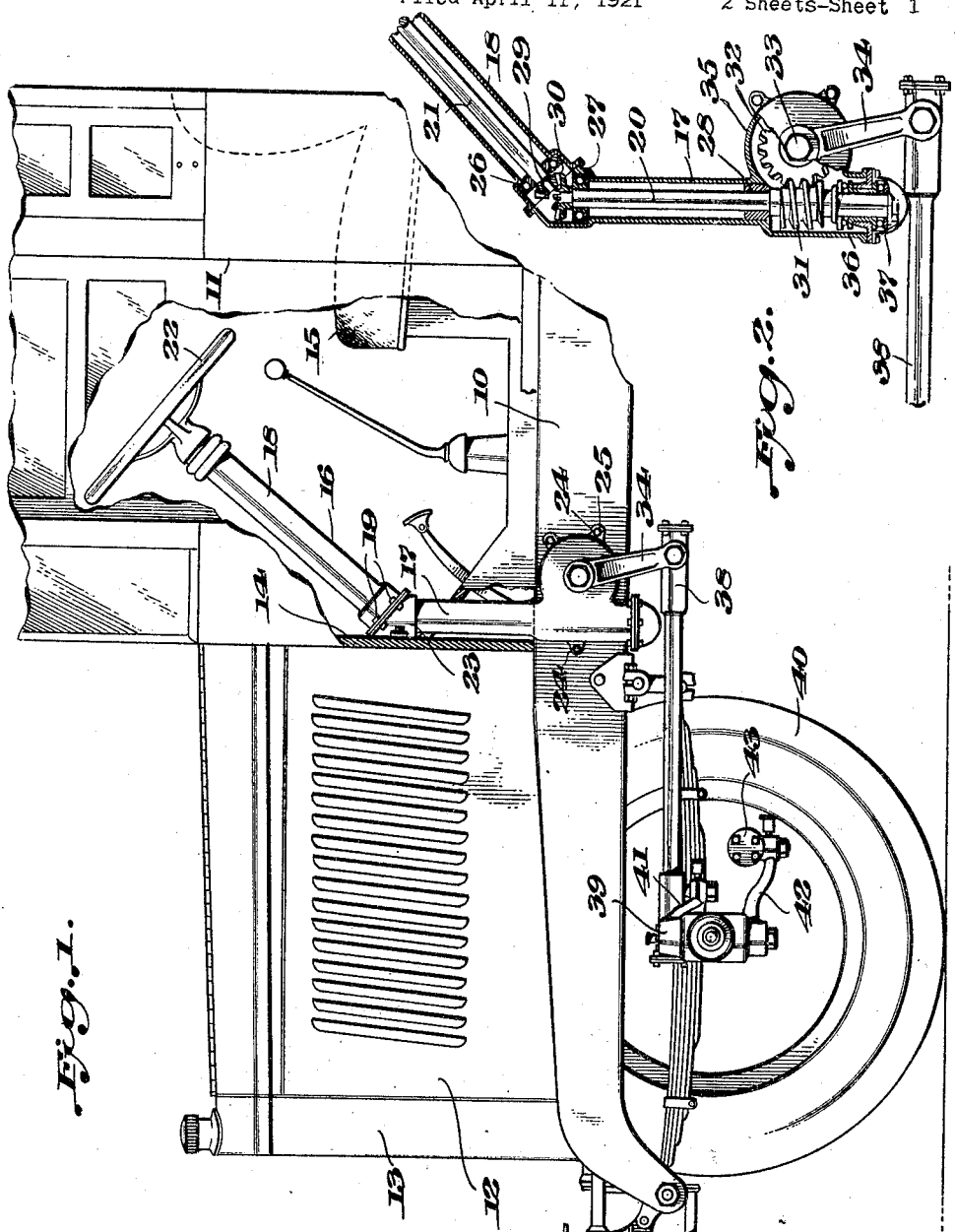

1,577,650

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed April 11, 1921. Serial No. 460,540.

*To all whom it may concern:*

Be it known that I, ALFRED MOORHOUSE, a citizen of the United States, and resident of Detroit, Wayne County, State of Michigan, have invented certain new and useful Improvements in Motor Vehicles, of which the following is a specification.

This invention relates to motor vehicles and more particularly to steering mechanism therefor.

It has been found desirable in the construction of the larger types of commercial vehicles or trucks to provide increased seating capacity in the cabs so that three or more persons may be accommodated. In order to do this the cab must be widened and the steering wheel must be moved toward the side of the vehicle. This change in position of the steering wheel is advantageous in that it enables the driver to get a clearer and a less obstructed view of the road, but in order to accomplish this change in location it is necessary to change the construction of the steering mechanism to prevent the interference of this mechanism with the other operative parts of the vehicle.

One of the objects of the invention is therefore to provide a commercial vehicle with an increased seating capacity.

Another object of the invention is to so locate the steering mechanism that the driver will have an unobstructed view of the road.

Another object of the invention is to provide a steering mechanism so mounted as to be free from all other operative parts of the vehicle.

Another object of the invention is to provide a steering mechanism so constructed as to be capable of giving a considerable range of reduction of movement between the steering wheel and the vehicle wheels.

One embodiment of the invention is illustrated in the accompanying drawings, which form a part of this specification and in which:

Fig. 1 illustrates in side elevation and partly in section the front end of a truck having steering mechanism constructed in accordance with my invention;

Fig. 2 is a detail sectional view showing the operative connections between the steering shaft which carries the steering wheel and the link which connects the steering mechanism to the steering wheels of the vehicle.

Figure 3:
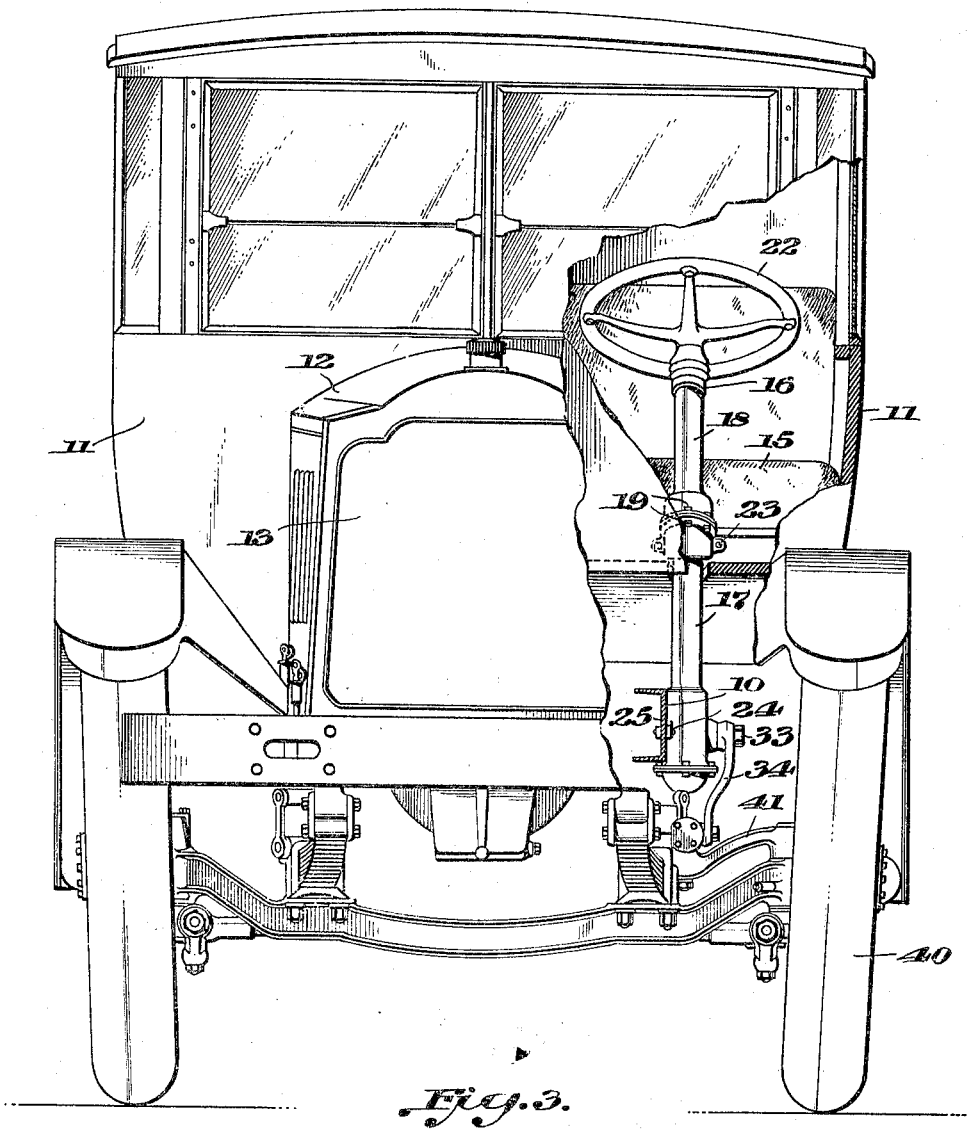
Fig. 3 is a front elevational view, partly broken away, of the construction shown in Fig. 1.

Referring to the drawings, I have shown a portion of the front end of a motor truck having longitudinal side frame members 10, a cab 11 being mounted on the frame 10 and the front end of the frame carrying a bonnet or hood 12 and radiator 13 of the usual construction, the motor being enclosed within the hood 12. A dash 14 is secured in any suitable manner to the frame, and a seat 15 is provided for the truck driver and for the other truck operatives.

As will be evident from the showing in Fig. 3, the cab 11 and the seat 15 are widened to provide for the accommodation of three or more operatives and this widening of the cab causes the cab to extend laterally at each side over the frame members 10.

In order that the driver may have a clear view of the road the steering mechanism 16 is located at once side of the frame and is secured in this instance to the outside surface of one of the longitudinal side frame members 10. If the usual construction of steering mechanism were employed and were located at the outside of the frame member 10, it would interfere with other parts of the vehicle and in order to obviate this difficulty and to secure other advantages which will be set forth, a novel type of steering mechanism is employed.

This mechanism comprises a pair of casings 17 and 18 which are secured together by means such as rivets or bolts 19, the lower casing 17 housing a substantially vertically disposed shaft 20 and the upper casing 18 housing a steering shaft 21 to the upper end of which is secured the usual steering wheel 22.

The casing 17 is secured in any suitable manner, as by bolts 23, to the dash 14 and is also secured to frame member 10 by bolts 24 which pass through apertured lugs 25 formed on the casing 17.

The shaft 21 is mounted in suitable bearings 26 carried by the casing 18 and the shaft 20 is mounted in bearings 27 and 28 carried by casing 17.

The rotation of the shaft 21 by the wheel 22 is communicated to the shaft 20 through bevel gears 29 and 30 secured respectively to shafts 21 and 20. These gears, it will be understood, may have any suitable ratio. The shaft 20 has secured to or formed on its lower end a worm 31 which transmits the rotation of the shaft 20 through a worm gear 32 carried by a jack shaft 33 to an arm 34 secured to said shaft. The shaft 33 is mounted in an extension 35 of the casing 17 and it will be understood that this extension and the casing may be made sectional if desired in order to provide for the assembling of the shaft, worm and worm gear. A thrust bearing 36 is provided at the lower end of casing 17 for taking up the vertical thrust of the worm 31 and the lower end of this casing is closed by a cap 37.

The arm 34 is connected by tubular link 38 to the usual steering knuckle 39 which communicates the movement of the steering mechanism to the wheels 40 in the well known manner, the upper end of the steering knuckle having an arm 41 engaged by the link and the lower end having an arm 42 which is connected by the usual steering knuckle cross tube 43 to similar steering knuckle mechanism on the opposite side of the frame.

The connections from the steering shaft 21 to the steering knuckle mechanism are so simple in construction that no detailed description of the operation seems to be necessary, but it will be evident from the preceding description that any desired reduction of movement between the steering wheel and the steering knuckles may be obtained by merely changing the ratio between the gears 29 and 30 which connect the shafts 20 and 21. By locating the steering mechanism at the side of the frame the driver is given an unobstructed view of the road and this view is not impaired by the dash, bonnet and radiator as is the usual case. Furthermore, by locating the driver at the extreme side of the cab he is enabled to more readily signal the driver of a following vehicle in case he intends to stop or to turn a corner.

Although one specific embodiment of the invention has been illustrated and described, it will be understood that the invention is capable of modification and that modification and changes in the construction and in the arrangement of the various cooperating parts may be made without departing from the spirit or scope of the invention as expressed in the following claims.

Having thus described my invention, what I claim and desire by Letters Patent is:

1. In a motor vehicle, a frame having longitudinal side frame members, a casing secured thereto, gearing in the casing a shaft rotatably mounted in said casing connected to the gearing, a second casing secured to said first named casing, a steering shaft rotatably mounted in said second casing and operatively connected through gearing to said first named shaft, a steering wheel secured to said steering shaft, supporting wheels for said vehicle and operative connections including the gearing between said wheels and the first named shaft, whereby said wheels may be angled.

2. In a motor vehicle, a frame, a cab extending laterally over said frame at one side thereof, steering mechanism located at one side of said cab and including a substantially vertical shaft operatively connected to the wheels of the vehicle for angling the wheels, and an inclined shaft operatively connected to the first named shaft by means outside the frame, and having a steering wheel secured thereto.

3. In a motor vehicle having wheels and a frame, a cab mounted thereon and extending over said frame at one side thereof, a vertically disposed dash mounted on the frame in front of the cab, and steering mechanism for the vehicle adapted to be actuated from said cab, comprising a steering shaft inclined to said dash and provided with a steering wheel, a vertically disposed shaft supported from the dash and geared to the steering shaft, and gear means located outside the frame and supported therefrom for angling the vehicle wheels.

In testimony whereof I affix my signature.

ALFRED MOORHOUSE.